United States Patent
Raghavendra et al.

(10) Patent No.: US 11,481,267 B2
(45) Date of Patent: Oct. 25, 2022

(54) REINFORCEMENT LEARNING APPROACH TO ROOT CAUSE ANALYSIS

(71) Applicant: International Business Machines Corporation, Armonk, NY (US)

(72) Inventors: Ramya Raghavendra, New york, NY (US); Mudhakar Srivatsa, White Plains, NY (US); Joshua M. Rosenkranz, White Plains, NY (US); Pranita Sharad Dewan, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 266 days.

(21) Appl. No.: 16/885,482

(22) Filed: May 28, 2020

(65) Prior Publication Data

US 2021/0373987 A1    Dec. 2, 2021

(51) Int. Cl.
G06F 11/07 (2006.01)
G06F 11/30 (2006.01)
G06N 5/02 (2006.01)
G06K 9/62 (2022.01)
G06F 16/31 (2019.01)

(52) U.S. Cl.
CPC .......... *G06F 11/079* (2013.01); *G06F 11/302* (2013.01); *G06F 16/322* (2019.01); *G06K 9/6215* (2013.01); *G06K 9/6262* (2013.01); *G06N 5/022* (2013.01)

(58) Field of Classification Search
None
See application file for complete search history.

(56) References Cited

U.S. PATENT DOCUMENTS

| 5,608,843 | A | 3/1997 | Baird |
| 10,740,634 | B1 * | 8/2020 | Katsuki .............. G06K 9/6293 |
| 2003/0055804 | A1 * | 3/2003 | LaButte ............... G06Q 10/06 706/50 |

(Continued)

FOREIGN PATENT DOCUMENTS

| CN | 102207928 B | 10/2011 |
| CN | 109657802 A | 10/2011 |

(Continued)

OTHER PUBLICATIONS

Arkady Epshteyn and Gerald DeJong, "Qualitative reinforcement learning," Proceedings of the 23rd international conference on Machine learning (ICML '06). ACM, New York, NY, USA, 305-312. 8 Pages.

(Continued)

*Primary Examiner* — Qing Chen
(74) *Attorney, Agent, or Firm* — Cantor Colburn LLP; Joseph Petrokaitis (57) ABSTRACT

Aspects of the invention include generating a vector representation of a root node of the error based on a hierarchical topology of a computing system; generating a respective vector representations of each subject matter expert of a plurality of subject matter experts based at least in part on the hierarchical topology; selecting a subject matter expert based at least in part on the vector representation of root cause of the error; and uploading a diagnostic software to the computing system.

17 Claims, 6 Drawing Sheets

(56) References Cited

U.S. PATENT DOCUMENTS

| | | | |
|---|---|---|---|
| 2006/0101402 A1* | 5/2006 | Miller | G06F 11/3636 |
| | | | 717/124 |
| 2007/0028219 A1* | 2/2007 | Miller | G05B 23/0275 |
| | | | 717/124 |
| 2007/0028220 A1* | 2/2007 | Miller | G05B 23/0278 |
| | | | 717/124 |
| 2009/0006970 A1* | 1/2009 | Jeffery | D06F 34/05 |
| | | | 715/733 |
| 2009/0183030 A1* | 7/2009 | Bethke | G06F 11/079 |
| | | | 714/37 |
| 2009/0217163 A1* | 8/2009 | Jaroker | G06F 8/60 |
| | | | 717/174 |
| 2011/0307285 A1* | 12/2011 | Kale | G06Q 10/06315 |
| | | | 705/7.14 |
| 2012/0166705 A1* | 6/2012 | Dai | G06F 9/45558 |
| | | | 711/6 |
| 2014/0114613 A1* | 4/2014 | Wang | G06F 11/0736 |
| | | | 702/183 |
| 2017/0330077 A1 | 11/2017 | Williams et al. | |
| 2018/0060150 A1* | 3/2018 | Cunico | G06F 3/013 |
| 2019/0034512 A1* | 1/2019 | Baral | G06F 16/287 |
| 2019/0377571 A1* | 12/2019 | Gupta | G06Q 10/06398 |
| 2020/0117734 A1* | 4/2020 | Sylos | G06F 11/0709 |
| 2021/0350253 A1* | 11/2021 | Wang | G06F 16/9024 |

FOREIGN PATENT DOCUMENTS

| | | |
|---|---|---|
| CN | 103390195 B | 11/2013 |
| CN | 103914560 B | 7/2014 |

OTHER PUBLICATIONS

William Hamilton, Mahdi Milani Fard, and Joelle Pineau, "Efficient learning and planning with compressed predictive states," Journal of Machine Learning Research, 15, 1 (Jan. 2014), 45 Pages.

* cited by examiner

REINFORCEMENT LEARNING APPROACH TO ROOT CAUSE ANALYSIS

STATEMENT REGARDING FEDERALLY SPONSORED RESEARCH OR DEVELOPMENT

This invention was made with Government support under Contract No.: W911NF-15-R-0003 awarded by Army Research Office (ARO). The Government has certain rights in this invention.

BACKGROUND

The present invention generally relates to programmable computers, and more specifically relates to programmable computers configured to implement error analysis techniques that incorporate a reinforcement learning approach to root cause analysis.

Root cause analysis is a systematic approach for locating a computer system node that is the root cause of an error in the computer system environment. A computer system has a hierarchy that includes a number of different computer nodes, such as servers, switches, and storage systems. If one of these computer nodes should cause a failure or error, the failure will affect any other computer nodes connected to that computer node in the system hierarchy. In this instance, the computer system can be programmed to issue error event messages to the administrator from a number of different computer nodes. Thus, as computer systems become more complex, it can be very difficult for an administrator to determine the computer node that is the actual root cause of the failure. Even when a root cause is identified, it can be difficult for an administrator to assign an appropriate subject matter expert (SME) to address a failing node.

SUMMARY

Embodiments of the present invention are directed to a reinforcement learning approach to root cause analysis. A non-limiting example computer-implemented method includes generating a vector representation of a root node of the error based on a hierarchical topology of a computing system; generating a respective vector representation of each subject matter expert of a plurality of subject matter experts based at least in part on the hierarchical topology; selecting a subject matter expert based at least in part on the vector representation of root cause of the error; and uploading a diagnostic software to the computing system.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagrams or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

One or more embodiments of the present invention provide computer-implemented methods and computer-based systems for pairing a root cause of an error with a subject matter expert using reinforcement learning.

Anomaly forecasting is a technique used in error detection and can be performed by collecting statistical data related to components of a computing system. The statistical data is collected and processed to determine certain statistical measures, or ground truths, associated with the collected data, such as the mean, median, standard deviation, etc. These statistical measures can be analyzed to forecast signal patterns that are predicted to be generated by a theoretical computing system.

During operation of an actual computing system, performance related signals that are generated are sampled to detect any patterns. The sampled signals can be compared with the forecasted signal patterns to detect any anomalies. In the event that an anomaly is detected, root cause analysis techniques can be employed to determine a root node causing the anomaly. A system administrator can assign a subject matter expert (SME) to resolve the issue in the computing system. However, given the complexity of modern computing systems and the specialization of many SMEs, system administrators face difficulties with selecting an appropriate SME for a respective anomaly.

One or more embodiments of the present invention address one or more of the above-described shortcomings of the prior art by providing computer-based methods and computing systems that uses a hierarchical representation of a computing system to describe a root cause of an error and a severity of the error. Additionally, the computing systems generate a database of a pool of SMEs and SME teams that are organized based on the SME's expertise with various system components identified in the hierarchical representation. Once a root cause is identified, a computing system can select one or more appropriate SMEs or SME teams to resolve the error based on a comparison of the problem and the expertise of the SME team. The SME or SME can be presented in a ranked list and a system administrator can select the appropriate SME for resolving the error.

Figure 1:
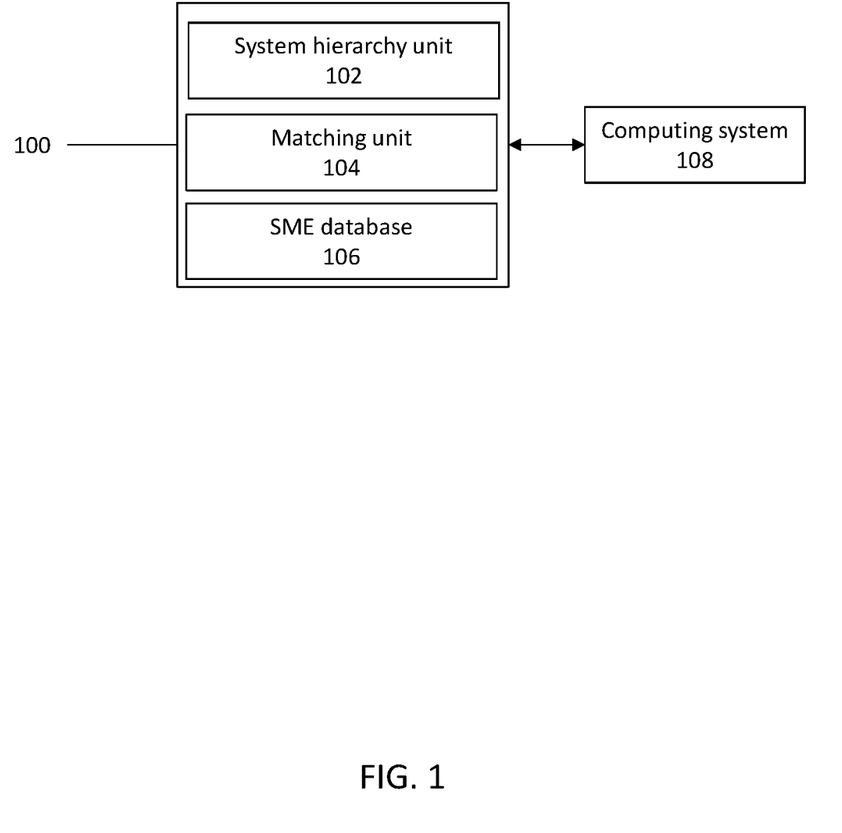
FIG. 1 illustrates a block diagram of components of a system for pairing an error with a subject matter expert in accordance with one or more embodiments of the present invention.

Turning now to FIG. 1, a system 100 is generally shown in accordance with one or more embodiments of the present invention. The system 100 includes a system hierarchy unit 102, a matching unit 104, and an SME database 106. In embodiments of the invention, the system 100 is configured to monitor a computing system 108. Periodically, the system 100 can receive an error message from the computing system 108 suggesting an error has occurred in the computing system 108. In response to the error message, the matching unit 104 is configured to analyze data collected from the monitored computing system 108 and determine a presence of an anomaly and a root cause of an error. The matching unit 104 compares forecasted time series data for and actual time series data from each unit of the computing system 108. The matching unit 104 searches for deviations between the forecasted time series data and the collected time series data. Once a deviation is detected, the matching unit 104 calculates a degree of variation between the deviation and the forecasted time series data. Whether a deviation constitutes an actual anomaly is based in part on the degree of the deviation from forecasted time series data. Once a potential anomaly is identified as an actual anomaly, the matching unit 104 performs a causal analysis to determine the root cause of the anomaly.

The matching unit 104 determines a root cause in connection with a hierarchical representation 200 (shown in FIG. 2) of the computing system 108. Using the hierarchical representation 200, which is stored in the system hierarchy unit 102, the matching unit 104 generates an anomaly vector describing a unit of the hierarchical representation 200 that is causing the anomaly. The anomaly vector describes an anomalous node. The anomaly vector quantifies each anomaly that has been detected as a result of the univariate anomaly detection and aggregation over the hierarchical representation 200. For example, if the matching unit 104 detects anomalies of CPU usage and bytes read at a node, the anomaly vector would contain include anomaly weights for each of these dimensions. The hierarchical representation 200 is a data structure that describes each unit of the computing system 108 and also describes relationships between the various units. The matching unit 104 calculates a score at each unit of the hierarchical representation 200. The score describes a magnitude of a deviation from the forecasted time series data. The scores are used to determine a root cause of the anomaly. Once the root cause is identified, the matching unit 104 further uses the score to generate an anomaly vector describing the location of the root cause and a severity of the problem.

The matching unit 104 further retrieves a pool of available SMEs from the SME database 106. An identity and expertise of an SME can be individually described or as a member of an SME team. Each SME or SME team is described as a vector representation, where a dimension of the vector is related to a number of subject matters in which the SME has expertise. Each SME vector is also used to populate a same vector space and the anomaly vector. The matching unit 104 matches the anomaly vector with an appropriate SME vector based on a determination that the SME team has expertise in the unit causing the error. To perform this operation, the matching unit can be configured to employ a machine learning algorithm, for example, a reinforcement learning technique, to pair an appropriate SME with the unit causing the error in the computing system 108.

Figure 2:
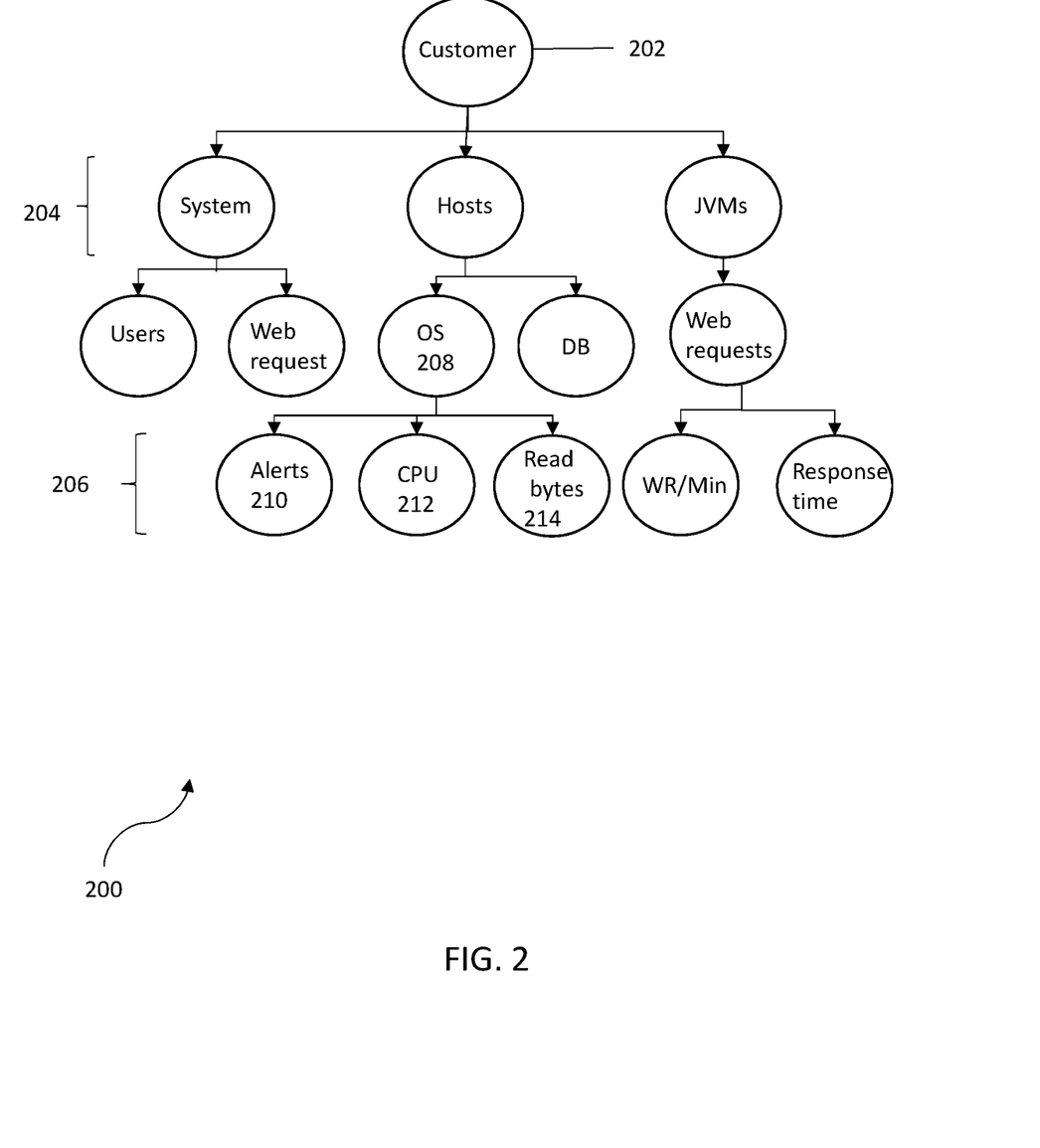
FIG. 2 illustrates a hierarchical topology of a computing system in accordance with one or more embodiments of the present invention.

Referring to FIG. 2, an exemplary implementation of the hierarchical representation 200 is shown. The hierarchical representation 200 can be a data structure arranged in a tree structure. The tree structure is comprised of a set of nodes connected to a root node 202. Each node describes a unit of the computing system 108. For example, a unit can include, but not be limited to cached memory, read bytes, and operating system 208, and any node described in FIG. 2. The root node 202 is connected to a set of child nodes 204 that are below the root node 202 in terms of the computing system's hierarchy 200. Leaf nodes 206 have the lowest position in the computing system's hierarchy 200. Each node can be considered a unit in a computing system 108. Each child node can be considered subordinate to their respective parent nodes. For example, alerts 210, a central processing unit 212, and a input out per second count (IOPS) 214 can be subordinate to an operating system 208.

In the event that an error is detected, each node can further include an anomaly score. The anomaly score is derived from time series data collected at each node and reflective of deviation of a node's deviation from a desired set of key performance indicator (KPIs). KPIs are a set of metrics used by administrators to determine the operational performance of an information system, including but not limited to efficiency, throughput, availability, from productivity, quality and maintenance perspectives. KPIs can vary based on the components and functionality of a computing system. Through continuous monitoring and measurement of KPIs, meaningful quantification and identification of different aspects of operation activities can be obtained, which enable and direct continuous improvement efforts.

In addition to determining an SME to assign to resolve an error, the matching unit 104 pairs a root cause and an SME with a diagnostic software. Diagnostic software is software used to identity and resolve software or hardware related issues of a computing system. Computing issues stem from different nodes or combination of nodes. Therefore, different diagnostic software are used to analyze different computer related issues. Furthermore, each diagnostic software includes a different user interface and functionalities and, therefore, different SME's prefer different diagnostic software. The matching system monitors the diagnostic software utilized by each SME. Each SME vector includes information describing diagnostic software associated with an SME or SME team. Therefore, upon selecting an SME or SME team, a preferred diagnostic software can be upload to the computing system.

The matching unit 104 may further record performance statistics from SME's resolving issues. The performance statistics may be generated by monitoring the input and output signals and each node. The performance statistics may be aggregated to produce general statistics regarding the an efficiency for resolving an error in a computing system. The performance statistics may include a diagnostic software used by an SME or SME team. Therefore, the matching unit 104 can analyze the performance statistics to determine if a diagnostic software demonstrated a higher than average time to analyze and isolate a potential issue at a node. Each anomaly vector includes information describing diagnostic software associated with a highest performance of determining an issue at a respective node.

The matching unit 104 can compare the SME vector with the anomaly vector to compare diagnostic software preferred by the SME with the optimal diagnostic software for the node. If in the instance the SME's preferred diagnostic software does not match the optimal diagnostic software, the matching unit 104 can transmit a recommendation of the optimal diagnostic software to the SME. The SME can choose to analyze the node with the preferred diagnostic software or the optimal diagnostic software. In either instance, the matching unit 104 can further compare the diagnostic software's performance time with the average performance time for the optimal diagnostic software. If the diagnostic program selected by the SME is different than optimal diagnostic program, the matching unit can execute the optimal diagnostic program upon completion of the SME's diagnostic software. The matching unit 104 can then present the SME with a comparisons of the similarities and discrepancies in results between the selected diagnostic software and optimal diagnostic software.

Figure 3:
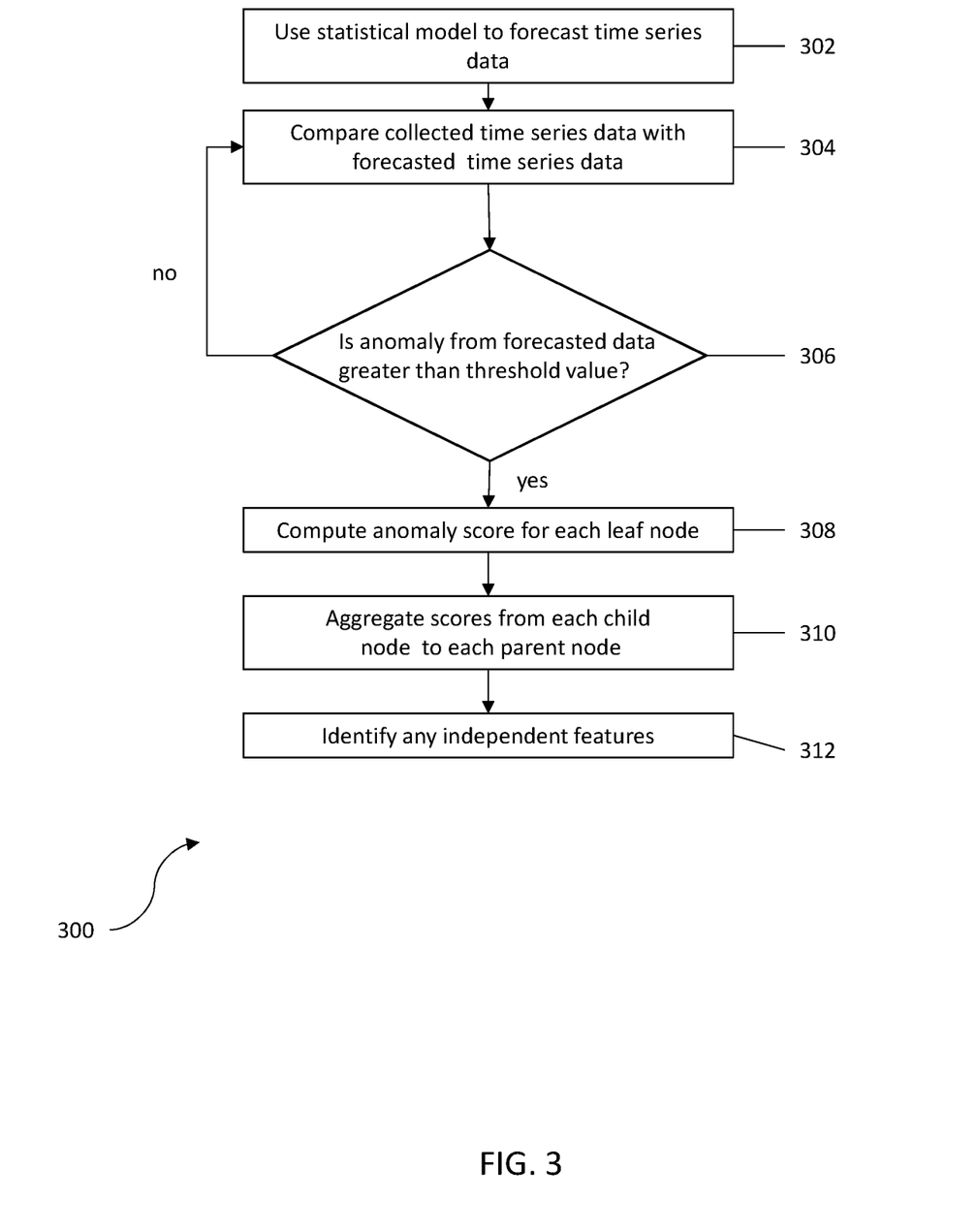
FIG. 3 illustrates a flow diagram of a process for generating an anomaly vector in accordance with one or more embodiments of the present invention.

Referring to FIG. 3, a method 300 for generating a vector from a hierarchical representation is shown. At block 302 a forecasting unit (not shown) uses a statistical model to forecast time series data. The statistical model is be generated based on collected data describing performance characteristics of an exemplary computing system. The statistical model can be used to generate a respective set of forecasted time series data for each unit of the exemplary unit. The forecasting unit analyzes forecasted set to determine any reoccurring patterns at the respective units, combinations of units, or at the entire computing system 108. It should be appreciated that various statistical models can be used to forecast time series data. For example, a univariate forecasting algorithm can be used. A univariate forecasting algorithm forecasts a time-series that consists of single observations recorded sequentially through time.

At block 304, in response to receiving an error message from a computing system, a matching unit receives time series data from each unit of the computing system 108. The matching unit 104 compares the collected time series data is compared to the forecasted time series data to determine if the detected patterns in the forecasted time series data are present in the collected time series data. At block 306, the matching unit 104 makes a determination as to whether any deviations from the patterns in the forecasted time series data amount to an anomaly. For example, each potential anomaly is given a weight w. If the collected time series data value is higher than the forecasted time series data then $$w = \max\left(0, \frac{g-u}{m}\right),$$

where g=grouna truth value, u equals upperbound value, and m=forecast value. If the collected time series data value is lower than the forecasted time series data, then $$w = \min\left(0, \frac{l-g}{m}\right).$$

where g=ground truth value, l equals lowerbound value, and m=forecast value. This metric describes how for the collected time series data deviates from the forecasted time series data. In some embodiments, the matching unit can employ a collaring technique, whereby an upper threshold and a lower threshold are established. If, for example, a value of the collected time series data is greater than the upper threshold value from the forecasted time series data, the deviation is an anomaly. If a value of the collected time series data is less than the lower threshold value from the forecasted time series data, the deviation is an anomaly. If the deviation is within the upper and lower threshold, the deviation is not an anomaly. This process is repeated for each potential anomaly detected at each node.

If a higher or lower weight value w is not greater or less than the upper and lower threshold values, the deviation is not considered an anomaly and the process returns to block 304. If, however, w is greater or lesser than the upper and lower threshold values, an anomaly score is calculated for each leaf in the in the hierarchical structure of the computing system at block 308. The anomaly score for each leaf node is the weight w for any w greater than the threshold value. For any w within the upper and lower threshold values, the anomaly score is zero. At block 310, the anomaly score of each child incorporated into an anomaly score of their respective parent node. For example, if a parent node has child node A and child node B, the anomaly score for the parent node is calculated as $$\text{score} = \frac{\text{anomalyscore } A + \text{anomalyscore } B}{N},$$

where N equals the total number of anomalies at node A and node B. This process repeats until each anomaly score is calculated up to the root node 202 of the hierarchical representation 200. At block 312, the matching unit 104 determines any relationships between anomalies using, for example, a causal analysis or a principal component analysis. For example, node A and B can both have an anomaly score of 0.5, however node A can be causal to node B. Therefore, when determining a root cause, node A would be a better candidate as than node B. This further clarifies which node is a root cause of an error in the computing system 108.

Figure 4:
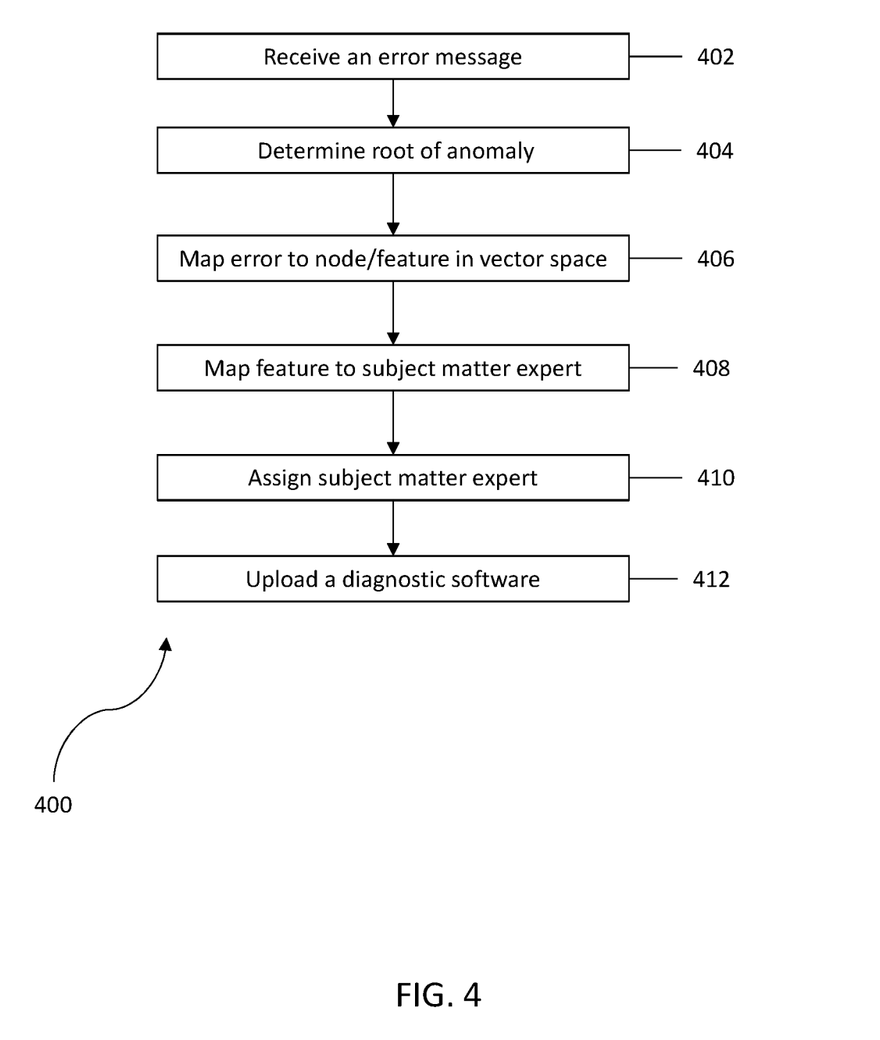
FIG. 4 illustrates a flow diagram of a process for generating an anomaly vector in accordance with one or more embodiments of the present invention.

Referring to FIG. 4, a method 400 for selecting an SME is shown. At block 402 the system 100 receives an error message from a monitored computing system 108. The error message includes information defining the error, including any qualitative and quantitative attributes (properties) of the error. At block 404, the matching unit 104 detects an anomaly using any appropriate method including the method described in FIG. 3. Furthermore, the matching unit 104 determines the root cause of the anomaly. Determining the root cause of an anomaly may be performed through various methods. The matching unit 104 receives stored data from the computing system 108, including time series data, collected along a timeline of events resulting in the error message. For each event along the timeline, the matching unit 104 makes a determination as to what action or inaction should have been performed in the timeline and how that differs from what was done or not done. This can be performed by reviewing stored signals and signal responses generated by various computing components during the timeline and comparing the signals with rules describing proper execution of a task. Afterwards, the matching unit 104 performs a causal analysis to classify a root cause of the anomaly. At block 406, the matching unit 104 maps the anomaly to one or more features in a vector space describing a computing system unit associated with the feature. Once the feature is identified, the matching unit 104 maps its representation in the vector space to an SME or a ranked list of SMEs at block 408. A catalog of available SMEs can be stored in any appropriate data structure, for example a list, a table, a dictionary, or other appropriate structure. Each subject matter expert is categorized and ranked by the computer system's 108 features that they have expertise in. At block 410, the system 100 generates a work ticket can be generated and a system administrator assigns an appropriate SME to resolve the issue. At block 412, a diagnostic software is uploaded to the monitored computing system.

In some embodiments of the invention, a time stamp can be recorded at the time of assigning an SME. A second time stamp can be recorded at the time the SME resolves the work ticket. The time required to complete the task can be recorded and compared with similar work tickets. Based on the comparison, an SME can be ranked higher or lower in comparison to other SMEs. Based on a ranking one SME can be chosen over another SME.

A vector space can be populated to define a set of SMEs that are arranged into teams based on a hierarchy of a respective computing system 108. A dimension of the vector space is based in part on the hierarchy 200 of the computing system 108. The anomalies and the SMEs are both described by vectors occupying the same vector space. The vectors describing the SME teams can be employ one-hot encoding to assist a machine learning algorithm rank of the SMEs. One hot encoding is a technique by which categorical variables are converted into a form that could be provided to a machine learning algorithm to predict a ranking of the SME.

Figure 5:
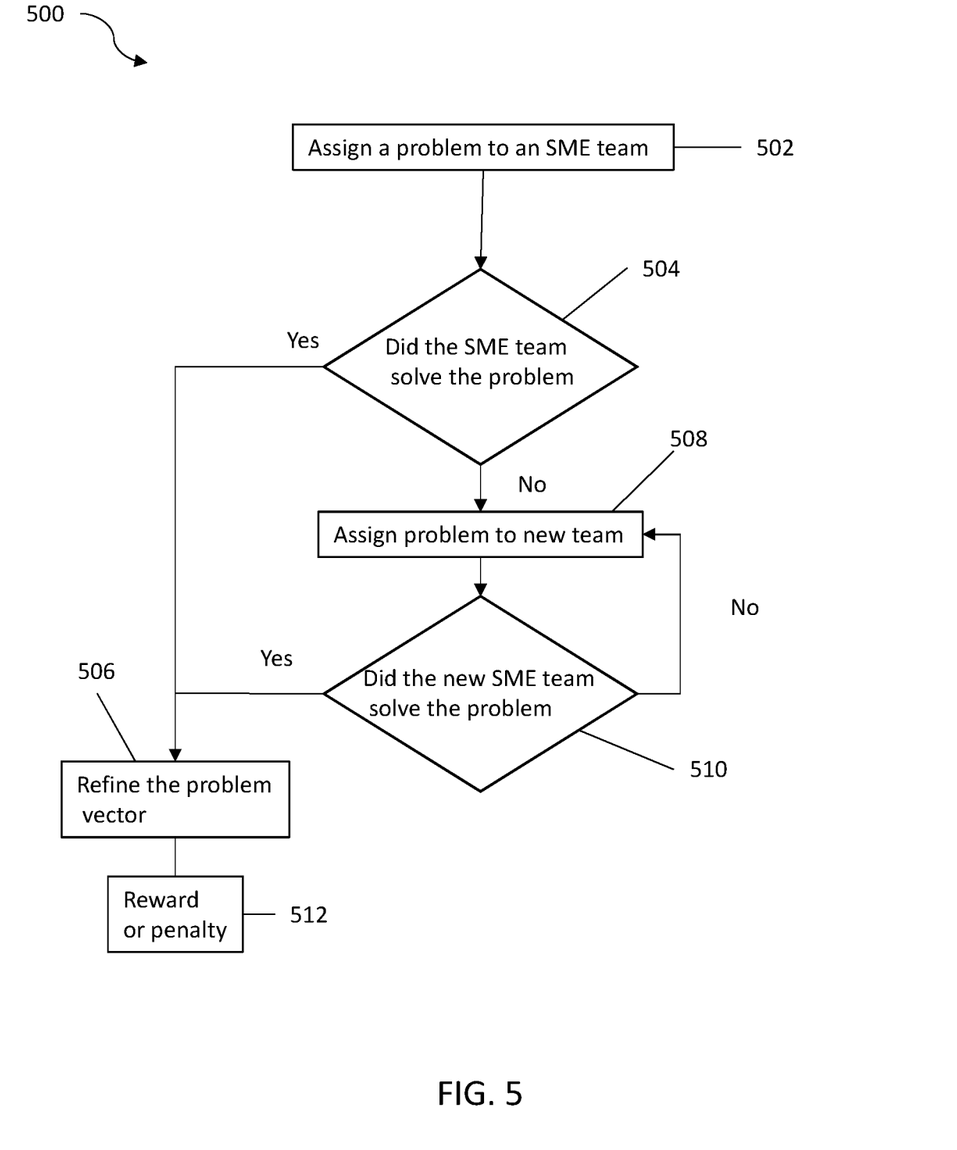
FIG. 5 illustrates a flow diagram of a process for training a root cause analysis unit in accordance with one or more embodiments of the present invention.

Referring to FIG. 5, a method 500 for training a machine learning unit using reinforcement training is shown. At block 502, a system administrator assigns a problem to an SME team. This can be accomplished by reviewing a ranked list of SME teams based on a pairing vector defining a problem with vector defining an SME with an expertise in solving the problem. At block 504, the system administrator determines whether the SME resolved the problem. This may be accomplished by reviewing an work ticket submission indicated whether the problem was resolved and who resolved the problem. If the SME resolved the problem, the system administrator revises the problem is revised by revising the problem vector at block 506. At this point the revised problem is assigned to another SME team for resolution at block 502. If, however, the SME did not resolve the problem, the problem is assigned to a new SME team at block 508. The problem can be assigned to the new SME team either in the same manner as the problem was assigned to the original SME team. Alternatively, the original SME team can assign the problem to a new SME team. At block 510 the system administrator determines whether the new SME team resolved the problem. If the new SME team resolved the problem, the problem vector is refined at block 506 and the machine learning unit is given a reward at block 512. If, however, the new SME team did not resolve the problem, the problem is reassigned once again to a third SME team at block 508. This process repeats until an SME resolves the problem. Once the last SME team solves the problem, the machine learning unit is given a penalty based on a number of times one SME team transferred the problem to another SME team at block 512. Thereby providing a system of rewards and penalties to train a machine learning unit to select the proper SME team.

The phrase "machine learning" broadly describes a function of electronic systems that learn from data. A machine learning system, engine, or module can include a machine learning algorithm that can be trained, such as in an external cloud environment learn functional relationships between inputs and outputs that are currently unknown. In one or more embodiments, machine learning functionality can be implemented using an artificial neural network (ANN) having the capability to be trained to perform a currently unknown function. In machine learning and cognitive science, ANNs are a family of statistical learning models inspired by the biological neural networks of animals, and in particular the brain. ANNs can be used to estimate or approximate systems and functions that depend on a large number of inputs.

Reinforcement learning is a machine learning technique that applies a function to describe the expected future discounted rewards in a particular state or for a particular state action pair. Reinforcement learning can be used to train a machine learning model to make a sequence of decision. A machine learning unit applies a model to learn to achieve a goal in an uncertain environment. Rather than supervised or unsupervised learning, the machine learning unit employs trial and error technique to reach a solution to the problem. Based on the solution, the machine learning unit either rewarded or penalized for the sequence of decisions used to reach the solution. The machine learning unit's goas is to maximize a total reward, which is designated by the programmer of the machine learning unit.

Figure 6:
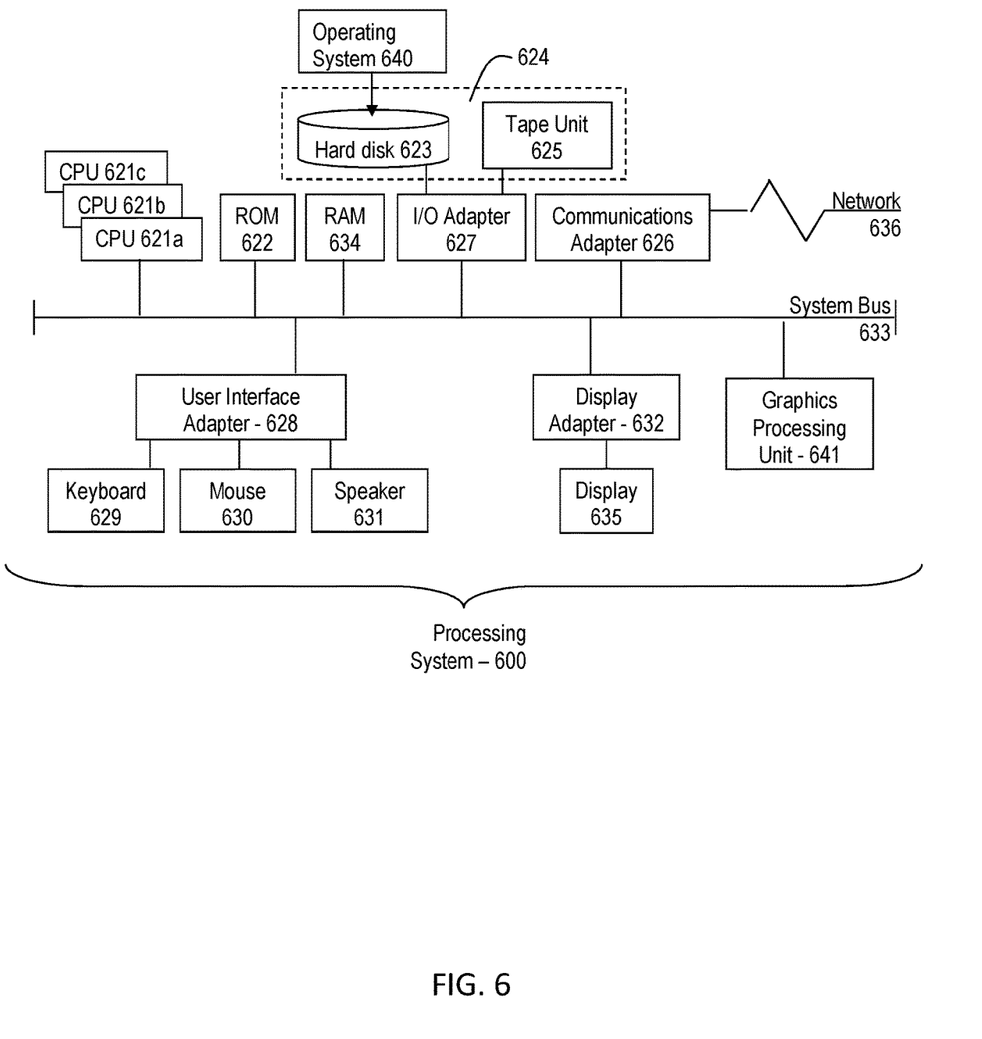
FIG. 6 illustrates a block diagram of a processing system in accordance with one or more embodiments of the present invention.

It is understood that the present disclosure is capable of being implemented in conjunction with any other type of computing environment now known or later developed. For example, FIG. 6 depicts a block diagram of a processing system 600 for implementing the techniques described herein. In examples, the processing system 600 has one or more central processing units (processors) 621a, 621b, 621c, etc. (collectively or generically referred to as processor(s) 621 and/or as processing device(s)). In aspects of the present disclosure, each processor 621 can include a reduced instruction set computer (RISC) microprocessor. Processors 621 are coupled to system memory (e.g., random access memory (RAM) 624) and various other components via a system bus 633. Read only memory (ROM) 622 is coupled to system bus 633 and can include a basic input/output system (BIOS), which controls certain basic functions of the processing system 600.

Further depicted are an input/output (I/O) adapter 627 and a network adapter 626 coupled to the system bus 633. I/O adapter 627 can be a small computer system interface (SCSI) adapter that communicates with a hard disk 623 and/or a storage device 625 or any other similar component. I/O adapter 627, hard disk 623, and storage device 625 are collectively referred to herein as mass storage 634. Operating system 640 for execution on processing system 600 can be stored in mass storage 634. The network adapter 626 interconnects system bus 633 with an outside network 636 enabling processing system 600 to communicate with other such systems.

A display (e.g., a display monitor) 635 is connected to the system bus 633 by display adapter 632, which can include a graphics adapter to improve the performance of graphics intensive applications and a video controller. In one aspect of the present disclosure, adapters 626, 627, and/or 632 can be connected to one or more I/O busses that are connected to the system bus 633 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 633 via user interface adapter 628 and display adapter 632. An input device 629 (e.g., a keyboard, a microphone, a touchscreen, etc.), an input pointer 630 (e.g., a mouse, trackpad, touchscreen, etc.), and/or a speaker 631 can be interconnected to system bus 633 via user interface adapter 628, which can include, for example, a Super I/O chip integrating multiple device adapters into a single integrated circuit.

In some aspects of the present disclosure, the processing system 600 includes a graphics processing unit 637. Graphics processing unit 637 is a specialized electronic circuit designed to manipulate and alter memory to accelerate the creation of images in a frame buffer intended for output to a display. In general, graphics processing unit 637 is very efficient at manipulating computer graphics and image processing and has a highly parallel structure that makes it more effective than general-purpose CPUs for algorithms where processing of large blocks of data is done in parallel.

Thus, as configured herein, the processing system 600 includes processing capability in the form of processors 621, storage capability including system memory (e.g., RAM 624), and mass storage 634, input means such as keyboard 629 and mouse 630, and output capability including speaker 631 and display 635. In some aspects of the present disclosure, a portion of system memory (e.g., RAM 624) and mass storage 634 collectively store the operating system 640 to coordinate the functions of the various components shown in the processing system 600.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
generating, by a processor, a vector representation of a root cause of an error based on a hierarchical topology of a computing system;
generating, by the processor, a respective vector representation of each subject matter expert of a plurality of subject matter experts based at least in part on the hierarchical topology of the computing system, wherein the hierarchical topology of the computing system is a tree-type data structure;
selecting, by the processor, a subject matter expert from the plurality of subject matter experts based at least in part on the vector representation of the root cause of the error; and
uploading, by the processor, a diagnostic software to the computing system,
wherein selecting the subject matter expert from the plurality of subject matter experts comprises:
assigning rankings to the respective vector representation of each subject matter expert of the plurality of subject matter experts;
inputting, to a machine learning algorithm, an assigned vector representation of a root cause of an error and the respective vector representation of each subject matter expert of the plurality of subject matter experts and a corresponding ranking of the respective vector representation of each subject matter expert of the plurality of subject matter experts; and
training the machine learning algorithm to select the subject matter expert from the plurality of subject matter experts corresponding to the assigned vector representation of the root cause of the error by rewarding the machine learning algorithm in response to a given subject matter expert among the plurality of subject matter experts resolves the assigned vector representation of the root cause of the error, and penalizing the machine learning algorithm in response to a given subject matter expert among the plurality of subject matter experts failing to resolve the assigned vector representation of the root cause of the error.

2. The computer-implemented method of claim 1, further comprising:
monitoring a progress of the selected subject matter expert from the plurality of subject matter experts in resolving the error; and
modifying the assigned vector representation of the root cause of the error based at least in part on whether the selected subject matter expert from the plurality of subject matter experts resolved the error.

3. The computer-implemented method of claim 2, further comprising adjusting a ranking of the selected subject matter expert from the plurality of subject matter experts based at least in part on the progress of the selected subject matter expert from the plurality of subject matter experts in resolving the error.

4. The computer-implemented method of claim 1, wherein the error is associated with a node of the tree-type data structure.

5. The computer-implemented method of claim 1, further comprising:
calculating a weight of each anomaly detected;
calculating an anomaly score for each leaf node in the tree-type data structure, wherein the anomaly score is based at least in part on the weight of each anomaly detected;
calculating an anomaly score for parent node of each leaf node by summing together a respective anomaly score of each leaf node that is a child node of the parent node of each leaf node, and
determining the root cause of the error based at least in part on a respective anomaly score of each node in the tree-type data structure.

6. The computer-implemented method of claim 5, further comprising:
collecting time series data at each node in the tree-type data structure;
comparing the collected time series data with respective forecasted time series data to detect a deviation from the respective forecasted time series data; and
calculating the anomaly score based on a degree of deviation from the respective forecasted time series data.

7. A system comprising:
a memory storing computer readable instructions; and
one or more processors executing the computer readable instructions, the computer readable instructions controlling the one or more processors to perform operations comprising:
generating a vector representation of a root cause of an error based on a hierarchical topology of a computing system;
generating a respective vector representation of each subject matter expert of a plurality of subject matter experts based at least in part on the hierarchical topology of the computing system, wherein the hierarchical topology of the computing system is a tree-type data structure;
selecting a subject matter expert from the plurality of subject matter experts based at least in part on the vector representation of the root cause of the error; and
uploading a diagnostic software to the computing system,
wherein selecting the subject matter expert from the plurality of subject matter experts comprises:
assigning rankings to the respective vector representation of each subject matter expert of the plurality of subject matter experts;
inputting, to a machine learning algorithm, an assigned vector representation of a root cause of an error and the respective vector representation of each subject matter expert of the plurality of subject matter experts and a corresponding ranking of the respective vector representation of each subject matter expert of the plurality of subject matter experts; and
training the machine learning algorithm to select the subject matter expert from the plurality of subject matter experts corresponding to the assigned vector representation of the root cause of the error by rewarding the machine learning algorithm in response to a given subject matter expert among the plurality of subject matter experts resolves the assigned vector representation of the root cause of the error, and penalizing the machine learning algorithm in response to a given subject matter expert among the plurality of subject matter experts failing to resolve the assigned vector representation of the root cause of the error.

8. The system of claim 7, wherein the operations performed by the one or more processors further comprise:
monitoring a progress of the selected subject matter expert from the plurality of subject matter experts in resolving the error; and modifying the assigned vector representation of the root cause of the error based at least in part on whether the selected subject matter expert from the plurality of subject matter experts resolved the error.

9. The system of claim 8, wherein the operations performed by the one or more processors further comprise adjusting a ranking of the selected subject matter expert from the plurality of subject matter experts based at least in part on the progress of the selected subject matter expert from the plurality of subject matter experts in resolving the error.

10. The system of claim 7, wherein the error is associated with a node of the tree-type data structure.

11. The system of claim 7, wherein the operations performed by the one or more processors further comprise:
   calculating a weight of each anomaly detected;
   calculating an anomaly score for each leaf node in the tree-type data structure, wherein the anomaly score is based at least in part on the weight of each anomaly detected;
   calculating an anomaly score for parent node of each leaf node by summing together a respective anomaly score of each leaf node that is a child node of the parent node of each leaf node, and
   determining the root cause of the error based at least in part on a respective anomaly score of each node in the tree-type data structure.

12. The system of claim 11, wherein the operations performed by the one or more processors further comprise:
   collecting time series data at each node in the tree-type data structure;
   comparing the collected time series data with respective forecasted time series data to detect a deviation from the respective forecasted time series data; and
   calculating the anomaly score based on a degree of deviation from the respective forecasted time series data.

13. A computer program product comprising a computer readable storage medium having program instructions embodied therewith, the program instructions executable by a processor to cause the processor to perform operations comprising:
   generating a vector representation of a root cause of an error based on a hierarchical topology of a computing system;
   generating a respective vector representation of each subject matter expert of a plurality of subject matter experts based at least in part on the hierarchical topology of the computing system, wherein the hierarchical topology of the computing system is a tree-type data structure;
   selecting a subject matter expert from the plurality of subject matter experts based at least in part on the vector representation of the root cause of the error; and
   uploading a diagnostic software to the computing system, wherein selecting the subject matter expert from the plurality of subject matter experts comprises:
      assigning rankings to the respective vector representation of each subject matter expert of the plurality of subject matter experts;
      inputting, to a machine learning algorithm, an assigned vector representation of a root cause of an error and the respective vector representation of each subject matter expert of the plurality of subject matter experts and a corresponding ranking of the respective vector representation of each subject matter expert of the plurality of subject matter experts; and
      training the machine learning algorithm to select the subject matter expert from the plurality of subject matter experts corresponding to the assigned vector representation of the root cause of the error by rewarding the machine learning algorithm in response to a given subject matter expert among the plurality of subject matter experts resolves the assigned vector representation of the root cause of the error, and penalizing the machine learning algorithm in response to a given subject matter expert among the plurality of subject matter experts failing to resolve the assigned vector representation of the root cause of the error.

14. The computer program product of claim 13, wherein the operations performed by the processor further comprise:
   monitoring a progress of the selected subject matter expert from the plurality of subject matter experts in resolving the error; and
   modifying the assigned vector representation of the root cause of the error based at least in part on whether the selected subject matter expert from the plurality of subject matter experts resolved the error.

15. The computer program product of claim 13, wherein the error is associated with a node of the tree-type data structure.

16. The computer program product of claim 13, wherein the operations performed by the processor further comprise:
   calculating a weight of each anomaly detected;
   calculating an anomaly score for each leaf node in the tree-type data structure, wherein the anomaly score is based at least in part on the weight of each anomaly detected;
   calculating an anomaly score for parent node of each leaf node by summing together a respective anomaly score of each leaf node that is a child node of the parent node of each leaf node; and
   determining the root cause of the error based at least in part on a respective anomaly score of each node in the tree-type data structure.

17. The computer program product of claim 16, wherein the operations performed by the processor further comprise:
   collecting time series data at each node in the tree-type data structure;
   comparing the collected time series data with respective forecasted time series data to detect a deviation from the respective forecasted time series data; and
   calculating the anomaly score based on a degree of deviation from the respective forecasted time series data.

* * * * *